United States Patent [19]

Fogg et al.

[11] 3,926,877
[45] Dec. 16, 1975

[54] PROCESS FOR ISOLATING POLYCHLOROPRENE

[75] Inventors: Sidney George Fogg, Ashstead, England; Peter Graham King, Peterston Super Ely; Elfed Yeoman, Barry, both of Wales

[73] Assignee: BP Chemicals International Limited, London, England

[22] Filed: Nov. 23, 1973

[21] Appl. No.: 418,385

[30] Foreign Application Priority Data
Dec. 6, 1972 United Kingdom............ 56236/72

[52] U.S. Cl... 260/23.7 A; 260/23.7 H; 260/29.7 R; 260/29.7 N; 260/29.7 SQ; 260/42.55; 260/42.57

[51] Int. Cl.². C08J 3/20; C08L 11/02; C08L 91/00

[58] Field of Search......... 260/42.55, 42.57, 23.7 A, 260/23.7 H

[56] References Cited
UNITED STATES PATENTS
2,879,173  3/1959  Yacoe.................... 260/42.14
3,345,323  10/1967  Endres et al............ 260/42.55
3,345,324  10/1967  Bristol et al........... 260/42.55
3,654,218  4/1972  Clas et al.............. 260/42.55

OTHER PUBLICATIONS
Carl—Neoprene Latex (duPont)(Wilmington, Del.)(1962), pp. 28 and 96.
Whitby—Synthetic Rubber (Wiley)(N.Y.)(1954), p. 670.
Rubber World—Matls. & Compounding Ingredients for Rubber (Bill Publications)(N.Y.)(1968), pp. 375 and 437.

Primary Examiner—Donald E. Czaja
Assistant Examiner—H. H. Fletcher
Attorney, Agent, or Firm—Brooks Haidt Haffner & Delahunty

[57] ABSTRACT

Polychloroprene rubber isolated from a latex as a crumb by blending with carbon black before coagulation, treating the coagulated particles with a finely divided solid anti-tack material and separating the product from the aqueous phase.

10 Claims, No Drawings

PROCESS FOR ISOLATING POLYCHLOROPRENE

The present invention relates to a process for the recovery of polychloroprene rubbers from aqueous latices. By a polychloroprene rubber is meant throughout this specification a rubbery material that has been prepared by the polymerization of chloroprene either alone or in admixture with copolymerisable materials. The copolymerisable materials must not be present to such an extent that the final product is no longer rubbery.

The polychloroprene rubbers are normally prepared by polymerising the chloroprene monomer in an aqueous phase under emulsion polymerisation conditions using a rosin acid soap as surfactant though the use of other surfactants is not excluded. The resultant product is in the form of a fine, stable dispersion of the rubber in the aqueous phase. The rubber may be recovered in a solid form by coagulating this latex to give a bulk product or by freeze coagulation and drying of a thin film or by hot drum drying. However, for many purposes, it is desirable to recover the polychloroprene rubber directly from the aqueous phase in the form of a finely divided crumb material, the crumb particles having sufficient stability to remain discrete during any filtration or centrifugation necessary to remove them from the aqueous phase and during subsequent drying and storage. However, when coagulants are added to a polychloroprene latex coagulation is incomplete and intractible masses of rubber containing an appreciable proportion of trapped uncoagulated latex are produced. Such masses cannot be washed and dried satisfactorily.

An object of the present invention is to provide a process for the recovery of polychloroprene rubber from an aqueous latex thereof in the form of finely divided crumb material.

According to the present invention, the process for the isolation of a polychloroprene rubber from an aqueous latex comprises blending the latex of the polychloroprene rubber with an aqueous dispersion of carbon black, adding a coagulant to the mixture, treating the coagulated rubber particles with a water dispersible anti-tack material either during and/or after coagulation and separating the coagulated product from the aqueous phase.

Any solid polychloroprene rubber can be isolated from its latex by the process of the present invention.

Any aqueous dispersion of carbon black can be employed provided that it has a sufficiently low viscosity to allow it to be mixed with the polychloroprene latex. The sodium salt of a naphthalene sulphonic acid/formaldehyde condensation product is particularly well suited for the preparation of aqueous dispersion of carbon black although the use of other surfactants is not excluded. The quantity and type of carbon black employed can be varied, according to the nature of the polychloroprene rubber but it is essential to have a minimum quantity with any given rubber in order to obtain a final product having a useful particle size. The ratio by weight of rubber to carbon black may vary in the range 20 to 400 parts of carbon black per 100 parts of rubber. Particularly useful products are obtained using from 50 to 100 parts of carbon black per 100 parts of rubber. Excessively high levels of carbon black lead to products which are too viscous to process in conventional rubber processing equipment.

The coagulation of the polychloroprene rubber carbon black mixture is brought about by adding a coagulant which renders the emulsifying agent which was used in the production of the rubber latex ineffective. For example, if the emulsifying agent employed is the salt of a wood rosin acid, or other carboxylic acid its emulsifying power can be reduced with the result that the rubber latex particles coagulate by the addition of a water soluble acid to the system, provided that the added acid is stronger than the carboxylic acid from which the emulsifying agent was formed. The emulsifying agents can also be rendered ineffective by the addition of water-soluble salts to the system, e.g. sodium chloride, calcium chloride, zinc sulphate or aluminum sulphate. It is advantageous to use mixtures of acid and salt coagulants. The coagulated rubber particles have to be treated in the process of the present invention with a water dispersible anti-tack material. By anti-tack material is meant throughout this specification a finely divided solid having a particle size less than 100 $\mu$ capable of reducing the tendency of rubber sheets to bond permanently to one another and an emulsifying agent to render it dispersible in water.

Since the anti-tack material is water-dispersible, it is thus most conveniently added to the dispersed or coagulated rubber particles in the form of an aqueous dispersion. The anti-tack material is preferably added to the coagulant solution and is thus present when the coagulation occurs. However, it can be added after coagulation provided that steps are taken to ensure that the coagulated rubber particles do not agglomerate to form large lumps of rubber before the anti-tack material has been added. When the anti-tack material is not added before coagulation, the coagulated rubber particles can be maintained in a suitable state of dispersion by for example, the use of high carbon black levels. Particularly good results are obtained when anti-tack materials as such or as aqueous dispersions are added to both the coagulant solution and the wash water after coagulation.

The preferred anti-tack material is a product sold under the trade name Lorco Bantac Plus. This is essentially an aqueous dispersion of fine particle size clay prepared using an emulsifying agent effective at acid pH, in the pH range 4–5. A number of anti-tack dispersions are known in the rubber industry and are employed to prevent sheets of rubber becoming permanently bonded to one another. They consist of blends of surfactants with a proportion of particulate filler. A dispersion of bentonite clay produced using sodium lauryl sulphate as emulsifying agent is very effective for the purpose of this invention. However, similar dispersions of mica, talc, finely divided calcium carbonate, silicas and poly(vinylchloride) powders also give good results. It is essential that the materials employed in the process of the present invention can be dispersed in water, for example the coagulant solution. Where the anti-tack material is added to the coagulant solution it is essential that the emulsifying agent is effective at pH 4–5. When the anti-tack material or its aqueous dispersion is added to the washed crumb this condition does not apply. Dispersions of talc are particularly effective when added to washed crumb.

The resistance to agglomeration of the products of the present invention can be increased by treating the crumb before drying with proprietary anti-tack materials such as Anti-Dust D31 a mixture of a bentonite clay, an oleic acid soap, and a surfactant of the alkyl sulphate type supplied by Compounding Ingredients Ltd.

Materials suitable for use in the present invention as anti-tack materials are also described as "parting agents" or "parting agent dispersions" in the rubber industry.

The coagulation of the polychloroprene rubber latex carbon black mixture and the treatment with the water dispersible anti-tack material according to the present invention may be carried out at normal ambient temperatures although elevated temperatures can be employed if desired.

Rubber modifiers and additives such as antioxidants, accelerators and the like can be added to the rubber latex either before or after the coagulation step if it is desired to have such materials present in the polychloroprene rubber crumb produced according to the process of the present invention. It is particularly useful to add salts, such as the calcium salts, of a long chain fatty acid, e.g. stearic acid, to the system because the presence of such salts in the crumb product increases the resistance of the product to agglomeration. It is convenient to form these salts in situ from alkali stearate incorporated in the latex blend and calcium chloride or zinc sulphate in the coagulant.

It is also useful to include in the coagulant solution a polyamine coagulant aid which assists in controlling the particle size of the crumb. Examples of such materials are Nalco N 107, supplied by Nalfloc Ltd., and polyamine H from Union Carbide. These polyamine compounds are widely used in effluent water treatment.

The polychloroprene rubber crumbs produced according to the process of the present invention are readily separated from the aqueous phase by filtration, centrifuging or other similar techniques, and are readily dried by conventional means, fluid bed and venturi driers being particularly suitable. Fluid bed drying in which fluidisation is produced by both mechanical means and a gas stream is preferred. This procedure helps to retain the parting agent on the crumb rather than blowing it away. Cooling of the latter portion of the bed in order to cool the product before bagging also improves the process. The ease with which they can be recovered gives the products of the present invention a considerable commercial advantage over similar products which have had to be recovered from an aqueous latex by the commercial techniques that have hereto been employed, e.g. by freeze coagulation followed by oven drying. After drying the products of the process of the present invention are in the form of a finely divided crumb material. This crumb form aids handling during rubber processing, particularly those processes involving automatic weighing and metering. The crumb form also reduces the time necessary to achieve well mixed compounds in conventional rubber mixing equipment.

The following examples illustrate the process of the present invention:

EXAMPLE 1

A stable dispersion of carbon black was prepared with a Silverson mixer according to the following recipe:

| | |
|---|---|
| Regal SRF Carbon Black | 100 parts |
| Bevaloid 35 | 1.5 parts |
| Potassium Stearate | 1.5 parts |
| Distilled Water | 150 parts |

Bevaloid 35 is sodium di-naphthylmethane sulphonate (Richard Hodgeson and Son). This dispersion was then added to samples of a polychloroprene latex which contained a mercaptan modified rubber of Mooney viscosity about 45, in the amount given in Table 1. The mixture was added dropwise at room temperature to the coagulant solution which consisted of an anti-tack material Lorco Bantac Plus, calcium chloride (anhydrous), hydrochloric acid and water in the proportions 10/6/0.7/1000. Lorco Bantac Plus is supplied by Anchor Chemical Co. Ltd. The coagulant solution was stirred vigorously with a propeller stirrer throughout the coagulation. The ratio of the black dispersion/latex mixture to the coagulant was 1 to 3. The product was separated by decantation, washed with water, then dried in an air-oven at 45°C for 24 hours. The nature of the products are described in Table 1.

TABLE 1

| Example | Carbon Black Loading (phr) | Description of Product |
|---|---|---|
| A | 29 | crumb 30 mm diameter |
| B | 58 | crumb 3 mm diameter |
| C | 72 | crumb 2 mm diameter |
| D | 100 | crumb 1 mm diameter |

(phr = parts per hundred parts of rubber).

These products could be bagged and stored under reasonable conditions without agglomeration taking place. The resistance to agglomeration could be further increased by a second treatment of the crumb with an anti-tack agent before final isolation and drying. Thus in a repetition of Example 1B the washed crumb was treated with a 5% aqueous talc slurry (Thew d Arnott; grade 3952) at a level of 5% on the rubber/black mixture. The product was centrifuged at 1500 rpm in 20 cm diameter basket centrifuge for 5 minutes. The crumb was then dried in a laboratory scale fluid bed dryer at 100°C for 45 minutes. The final crumb was less sticky and less prone to agglomeration than in Example 1B but of a similar size. It could withstand harsher packaging conditions without agglomeration occurring. It was examined by applying a pressure of 2 psi. to a 200 g. sample of crumb in a small plastic bag. After storage under this pressure for 3 months at 23°C the product was free flowing; no agglomeration to larger lumps had occurred.

EXAMPLE 2

A dispersion of Bentonite clay was prepared with a Silverson mixer according to the following recipe.

| | |
|---|---|
| Bentonite clay | 100 parts |
| Daxad 15 (naphthalene sulphonic acid/formaldehyde condensate) (W.R. Grace Ltd.) | 2.0 parts |
| Sodium lauryl sulphate | 2.0 parts |
| Distilled water | 100 parts |

Coagulation of a latex/carbon black dispersion mixture (100 parts rubber/58 parts black) was carried out as in Example 1 except that the Lorco Bantac Plus was replaced with 20 parts of the Bentonite dispersion per 1000 parts water in the coagulant solution. The washed crumb was treated with a 5% aqueous talc slurry at a level of 5% on the rubber/black mixture. The product was again in the form of a crumb and was recovered by decantation and oven-drying as in Example 1. It was of a similar size and resistance to agglomeration as the talc treated crumb of Example 1B.

Another sample of the crumb prepared in Example 2 was treated after washing with a 4% aqueous solution of the material "Anti-tack D31" supplied by Compounding Ingredients Ltd., in place of the 5% talc slurry. The crumb was recovered as in Example 1. The product was free-flowing.

We claim:

1. A process for the isolation of a polychloroprene rubber from an aqueous latex which comprises blending the latex of the polychloroprene rubber with an aqueous dispersion of from about 20–400 parts of carbon black to 100 parts of said rubber, mixing a coagulant with the mixture, treating the coagulated rubber particles with a water dispersible finely divided solid having anti-tack properties and a particle size less than $100\mu$ either during and/or after coagulation, when treating said rubber particles during coagulation any surfactant present with said antitack solid is effective at a pH of 4–5 and when treating said rubber particles after coagulation substantially preventing agglomeration of said rubber particles so that they do not form particles above about 30mm diameter, and separating the coagulated product from the aqueous phase.

2. A process as claimed in claim 1 wherein the aqueous dispersion of carbon black contains the sodium salt of naphthalene sulphonic acid formaldehyde condensation product as dispersion stabiliser.

3. A process as claimed in claim 1 wherein 50 to 100 parts of carbon black are employed per 100 parts of polychloroprene rubber.

4. A process as claimed in claim 1 wherein the coagulant is used in the form of a solution and the finely divided solid having anti-tack properties is added to said coagulant solution.

5. A process as claimed in claim 1 wherein a finely divided solid having anti-tack properties is present in the water used to wash the coagulated rubber particles after coagulation.

6. A process as claimed in claim 1 wherein the finely divided solid having anti-tack properties is an aqueous dispersion of fine particle size clay prepared using an emulsifying agent that is effective in the pH range 4–5.

7. A process as claimed in claim 1 wherein the finely divided solid is bentonite clay.

8. A process as claimed in claim 1 wherein the reaction mixture contains a calcium salt of a long chain fatty acid.

9. A process as claimed in claim 1 wherein the coagulant is added to the reaction mixture as an aqueous solution, said solution containing a polyamine coagulant aid.

10. A process as claimed in claim 1 wherein the coagulated product is dried in a fluid bed dryer in which fluidisation is produced by both mechanical means and a gas stream.

* * * * *